(No Model.) 2 Sheets—Sheet 1.
R. CRANE.
WATER SUPPLY SYSTEM.
No. 345,773. Patented July 20, 1886.
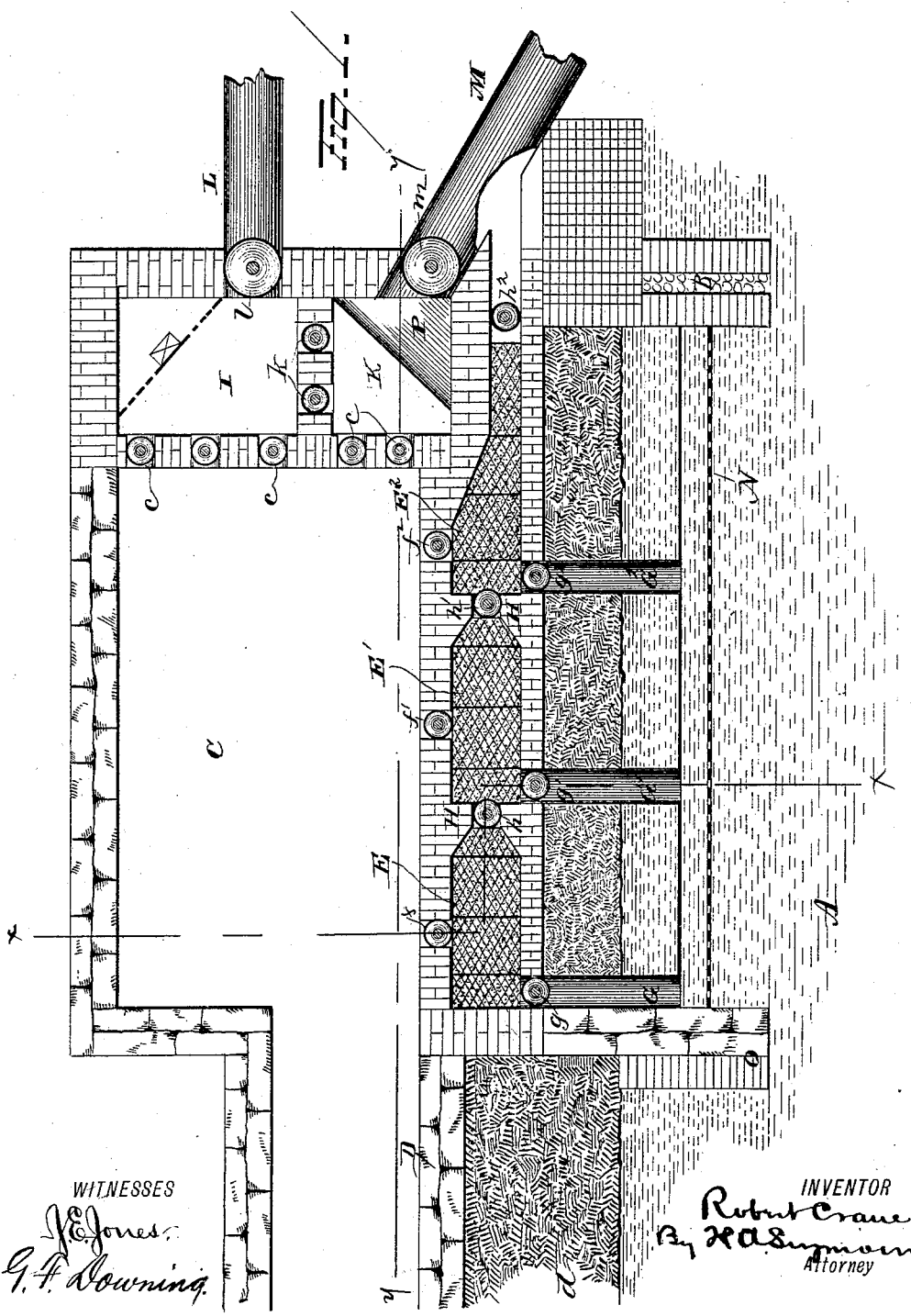
WITNESSES
J. E. Jones
G. F. Downing
INVENTOR
Robert Crane
By H. A. Symour
Attorney (No Model.) 2 Sheets—Sheet 2.
R. CRANE.
WATER SUPPLY SYSTEM.
No. 345,773. Patented July 20, 1886.
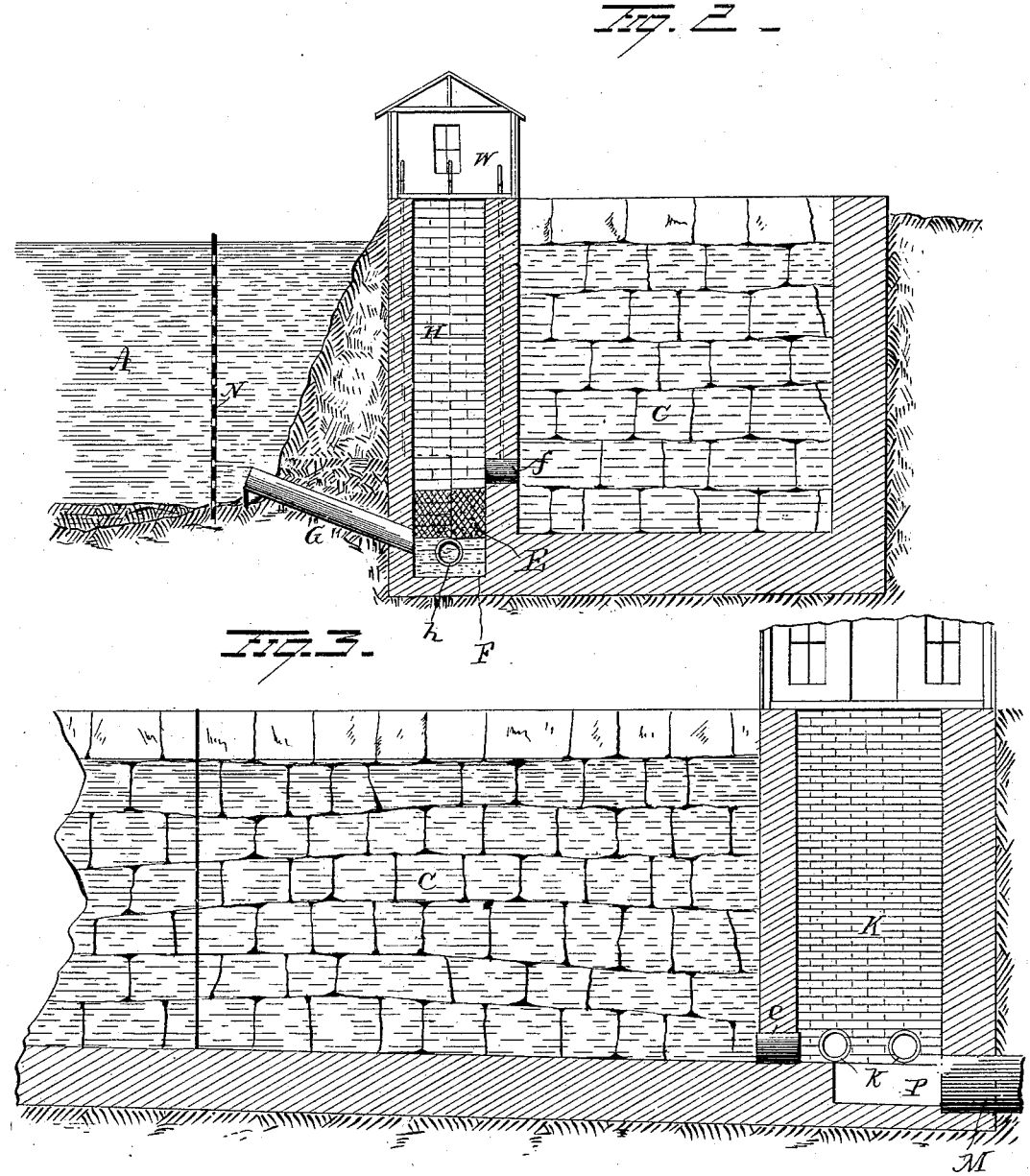
WITNESSES
J. E. Jones
G. F. Downing
INVENTOR
Robert Crane
By H. A. S—
Attorney

UNITED STATES PATENT OFFICE.

ROBERT CRANE, OF PHILADELPHIA, PENNSYLVANIA.

WATER-SUPPLY SYSTEM.

SPECIFICATION forming part of Letters Patent No. 345,773, dated July 20, 1886.

Application filed April 2, 1886. Serial No. 197,576. (No model.)

*To all whom it may concern:*

Be it known that I, ROBERT CRANE, of Philadelphia, in the county of Philadelphia and State of Pennsylvania, have invented certain new and useful Improvements in Water-Supply Systems; and I do hereby declare the following to be a full, clear, and exact description of the invention, such as will enable others skilled in the art to which it appertains to make and use the same.

My invention relates to an improvement in water-supply systems.

Hitherto it has been customary to locate a supply-reservoir on a hill, or at an elevation above the place to be supplied, and to force the water in its crude state from the river or other natural supply into the reservoir. The water in the supply-reservoir has been liable to become foul because of foreign substances suspended therein, and has been subject to a continual waste through the bottom of the reservoir. Moreover, the utility of filters has been materially impaired on account of the clogging of the filtering material by the small bits of foreign substance which have lodged therein, and the cleansing of said material has been a difficult and expensive operation.

The object of my present invention is to provide a water-supply system in which the supply-reservoir shall be constantly supplied with filtered water, and in which the said supply-reservoir and filters may be washed out and cleansed in a simple and effective manner.

With these ends in view my invention consists in certain features of construction and combinations of parts, as will be hereinafter described, and pointed out in the claims.

In the accompanying drawings, Figure 1 is a plan view of the system. Fig. 2 is a vertical section through line $x\,x$ of Fig. 1, and Fig. 3 is a vertical section through line $y\,y$ of Fig. 1.

A represents the river or other natural supply, across which a dam, B, is placed, as is usual, to increase the depth and quantity. At the side of the pool of the dam is formed an artificial basin, C, of sufficient extent to hold the amount of water required for service, and, as is customary in a supply-reservoir, a reserve quantity sufficient for any emergency which is likely to occur. The bottom of the basin C is three feet (more or less) below the bottom of the natural supply at the pool of the dam. The basin C is separated from the natural supply by a stone wall, D, and gravel bank $d$, the stone wall being preferably built on both sides of the gravel bank $d$, and the stones laid without mortar, so as to allow the water from the natural supply to filter through the bank into the reservoir. A series of filter-chambers, E E $E^2$, &c., are located between the natural supply at the pool of the dam and the supply reservoir or basin C, the upper surfaces of the filter-chambers being about on a level with or slightly above the bottom of the basin or supply-reservoir C, and the lower surfaces of the said filter-chambers being a sufficient distance above the bottom of the channel F, in which the filter-chambers are located, to admit quite a large stream of water beneath them. A series of inlet pipes or conduits, G G' $G^2$, &c., lead from the natural supply at the pool of the dam into the channel F beneath the filtering-chambers. The openings into the pipes G G' from the river are preferably three feet or more below the lowest mark which the water in the natural supply is likely to reach. The pipes or conduits G G', &c., pass through brick or stone masonry-work laid in cement, and are provided with cut-off valves $g\,g'$, &c., adapted to be operated from the floor of the building W, which latter rests on the masonry-work. The filter-chambers E are separated from each other by vertical walls H, in which are set the cut-off valves $h\,h'\,h^2$ at points below the lower surfaces of the filter-chambers proper. The upper and lower walls of the filter-chambers are formed of heavy wire-gauze or its equivalent, either alone or strengthened by slats, the meshes of the gauze being of such diameter that the filtering material will not escape through them, and yet large enough to allow the water to pass through freely. In the partition-wall between the channel F and the basin C, above the filtering-chambers, are located the valves $f$, which, as well as the valves $h\,h'$, &c., are adapted to be operated from the room above. From the supply reservoir or basin C the water is admitted through cut-off valves or gates $c$ into the service-chamber I, or washout-chamber K, as desired. The service-chamber I is also adapted to communicate with the washout-chamber K through the valves $k$. The service-pipe L leads from the chamber I to such places as can be supplied by gravity, while a pump forces the water from the said service-chamber to such places, or for such purposes as gravity will not suffice to provide for. The bottom of the supply reservoir or basin gradually declines toward the service and washout chambers, particularly toward the latter, and from the bottom of the washout-chamber a washout pipe or conduit, M, leads to the river below the dam. Both service-pipe and washout-conduit are supplied with cut-off valves $l$ and $m$, respectively, which, together with the valves $c$ and $k$, are adapted to be operated from the room above. The supply reservoir or basin C may be extended along the bank of the natural supply for any desired distance. A screen, N, is located a short distance from the mouths of the pipes G G', &c., extending from the dam to the ice-breaker O. A collector, P, is located diagonally across the washout-chamber K.

The operation of the system is as follows: The water from the river or natural supply flows into the supply reservoir or basin through the pipes G G' G², &c., into the channel F, beneath the filter-chambers, up through the said filter-chambers into the channel above, and thence through the valves $f f' f^2$, &c. The supply reservoir or basin C is also supplied to a greater or lesser degree by water which percolates through the gravel bank, separating the natural from the artificial supply. From the reservoir C the water is admitted through the valves $c$ into the service-chamber I, and from thence conducted, by suitable pipes, to such places as it is desired for use. The gradual decline in the bottom of the basin or reservoir C causes the sediment—such as may have escaped through the filter—to gather at the end where the service and washout chambers are located. Such sediment may be readily washed out into the river below by opening the valves $c$, leading from the basin C into the washout-chamber K, and at the same time opening the valve in the washout-pipe M. In like manner the service-chamber I may be cleansed by opening the valves $k$ in the washout-chamber.

The filters are cleaned as follows: The water in the natural supply being only an inch, or thereabout, higher than that in the reservoir or basin, the valve $h$ is opened and the valves $g g' g^2$ and $f' f^2$ closed. The result is that the water from the reservoir or basin C will set backwardly, rushing down through the filter-chamber E into the channel F below, carrying with it the foreign material which has clogged the filter, and forcing the same out through the valve $h^2$ into the washout-pipe M. When the filter E has been thus cleansed, the valve $f$ is closed and the valves $f'$ and $h'$ opened. The water from the reservoir C will now set back down through the chamber E', and through the valves $h'$ and $h^2$ into the washout-pipe M. In the same manner, by closing the valve $f'$ and opening the valves $f^2$ and $h^2$, the chamber E² may be cleansed, and so on for any number of chambers which may be employed. When all are cleansed, the valves $h h' h^2$, &c., may be closed and the valves $f f' f^2$ and $g g' g^2$ opened, and the supply of filtered water will again be furnished. One person may readily manage the whole, and a constant supply of pure water may be furnished at the most reasonable cost.

The artificial reservoir or basin may be either covered or partially covered, or may be entirely exposed, as may be found most expedient in different places. It is evident, also, that slight changes might be resorted to in the form and arrangement of the several parts without departing from the spirit and scope of my invention; hence I do not wish to limit myself strictly to the construction herein set forth; but, Having fully described my invention, what I claim as new, and desire to secure by Letters Patent, is—

1. In a water-supply system, the combination, with the natural water-supply, of an artificial reservoir or basin having its bottom located below the bottom of the natural supply, and formed on a gradual decline, and discharge-pipe and washout-chamber located at the lower end of the reservoir, for the purpose substantially as set forth.

2. In a water-supply system, the combination, with the artificial reservoir or basin fed by gravity from the natural supply, the bottom of said artificial reservoir being formed on a gradual decline, of the service-chamber and washout-chamber located at the lower end of the reservoir, and separated from said reservoir or basin by valves, substantially as set forth.

3. In a water-supply system, the combination, with the reservoir or basin fed by gravity from the natural supply through filtering material, the bottom of said reservoir or basin being formed on a gradual decline, of the collector and washout-chamber located at the lower end of the reservoir or basin, and having a valve opening into the reservoir, and a washout-pipe leading from the collector or washout-chamber to the river below the reservoir, substantially as set forth.

4. In a water-supply system, the combination, with the natural supply, the artificial supply separated from the natural supply by filtering material, and the service and collector or washout-chambers, arranged substantially as described, of valves for opening and closing communication between the natural supply and filters, and between the filters and artificial reservoir, valves for connecting the filters, service-pipes leading from the service-chamber, and washout-pipes leading from the filters and from the collector or washout-chambers, the several valves being adapted to be operated from a floor above, substantially as set forth.

5. In a water-supply system, the combination, with a supply-reservoir, of a series of filtering-chambers, service and collector or washout-chambers, and pipes connecting the filtering-chambers and reservoir, and arranged substantially as described, valves for opening and closing communication between the supply reservoir and chambers, and a washout-pipe or conduit leading from the collector or washout-chamber to a waste-conduit, substantially as set forth.

In testimony whereof I have signed this specification in the presence of two subscribing witnesses.

ROBERT CRANE.

Witnesses:
CHAS. BENJ. WILKINSON,
EVAN J. LESTER.